(12) United States Patent
Galbreath

(10) Patent No.: US 6,305,053 B1
(45) Date of Patent: Oct. 23, 2001

(54) CORD LOCK

(76) Inventor: John A. Galbreath, Reisterstown, MD (US)

( * ) Notice: Subject to any disclaimer, the term of this patent is extended or adjusted under 35 U.S.C. 154(b) by 0 days.

(21) Appl. No.: 09/496,064

(22) Filed: Feb. 1, 2000

(51) Int. Cl.[7] ............................ F16G 11/00; A44B 21/00
(52) U.S. Cl. ................... 24/129 R; 24/115 R; 24/115 G
(58) Field of Search ........................... 24/129 R, 129 A, 24/115 R, 115 G

(56) References Cited

U.S. PATENT DOCUMENTS

| 455,392 | * | 7/1891 | Ellis .................... 24/129 R |
| 947,111 | * | 1/1910 | Lorentz ................ 24/129 R |
| 1,879,991 | * | 9/1932 | Pratt .................... 24/129 R |
| 2,385,274 | * | 9/1945 | Hammond ............ 24/129 R |
| 2,729,480 | * | 1/1956 | Berndt ................. 24/129 R |
| 2,930,570 | * | 3/1960 | Leedy ................... 24/115 R |
| 4,222,157 | | 9/1980 | Forman ................ 24/129 A |
| 4,270,491 | * | 6/1981 | Cox ..................... 24/115 G |
| 4,288,891 | | 9/1981 | Boden .................. 24/115 G |
| 4,639,978 | | 2/1987 | Boden .................. 24/134 R |
| 4,769,874 | | 9/1988 | Tracy ................... 24/129 R |
| 5,193,252 | * | 3/1993 | Svehaug .............. 24/115 G |
| 5,197,166 | | 3/1993 | Meier et al. ......... 24/115 R |
| 5,263,528 | | 11/1993 | Patel .................... 160/178.2 |
| 5,361,461 | * | 11/1994 | Anscher ............... 24/115 G |
| 5,440,788 | | 8/1995 | Boden .................. 24/115 H |
| 5,451,082 | * | 9/1995 | Murai ................... 24/115 G |
| 5,572,770 | | 11/1996 | Boden .................. 24/136 R |
| 5,666,699 | | 9/1997 | Takahashi ............ 24/115 G |
| 5,671,505 | * | 9/1997 | Anscher ............... 24/115 G |
| 5,713,758 | | 2/1998 | Goodin et al. ....... 439/459 |
| 5,778,904 | | 7/1998 | Elsner .................. 132/275 |
| 5,791,022 | | 8/1998 | Bohman ............... 24/130 |
| 5,894,639 | | 4/1999 | Boden .................. 24/115 G |
| 5,987,712 | | 11/1999 | Tucker .................. 24/136 R |

* cited by examiner

Primary Examiner—Victor N. Sakran

(57) ABSTRACT

The device is a cord lock having an outer arm (10) and an inner arm (11) integrally connected by a hinging member (12). The device is constructed of resilient material, such that outer arm (10) and inner arm (11) will flex into slidable contact with each other when pressure is applied to their sides, and will flex back, away from each other, when the pressure is released. An outer arm opening (13) and inner arm opening (14) are located through the free ends of outer arm (10) and inner arm (11) respectively. To engage the device, outer arm (10) and inner arm (11) are urged together until outer arm opening (13) and inner arm opening (14) are in line with each other, and a cord is then threaded through the openings. The urging-together pressure is then released, causing outer arm (10) and inner arm (11) to slide back to a position wherein the cord is pinched between outer arm opening (13) and inner arm opening (14), and is prevented from moving.

19 Claims, 11 Drawing Sheets

CORD LOCK

CROSS-REFERENCES TO RELATED APPLICATIONS

Not Applicable

BACKGROUND OF THE INVENTION

1. Field of the Invention

This invention is in the area of cord locks, specifically a cord lock which has a simpler construction than prior art cord locks, and which can be easily manufactured of resilient material in a single piece.

2. Description of the Related Art

Various cord locks are known in the art, perhaps the most prevalent of which are the "barrel" or "plunger" locks shown in U.S. Pat. No. 4,288,891 to Boden; U.S. Pat. No. 5,197,166 to Meier et al.; U.S. Pat. No. 5,666,699 to Takahashi; U.S. Pat. No. 5,671,505 to Anscher; and U.S. Pat. No. 5,778,904 to Elsner. A major disadvantage of these locks is that they are comprised of multiple parts—a plastic plunger, a plastic cavity or barrel, and also usually an separate metal spring. These parts are formed separately and then assembled to make the lock, all of which entails considerable extra expense versus a one-piece design. This greater expense has prevented their use in some instances where having the convenience of a cord lock would be desirable.

A second major type of cord lock seen in the prior art comprises a male slide having serrated gripping teeth, which fits into a female socket through which the cord passes. The cord is pinched between the slide and the socket, and is thereby prevented from moving. Examples of this type of cord lock are shown in U.S. Pat. No. 5,572,770 to Boden; U.S. Pat. No. 5,894,639 to Boden et al.; and U.S. Pat. No. 5,987,712 to Tucker. Like the barrel locks discussed above, these locks are formed of two or more pieces, and so have the disadvantage of extra forming and assembly cost versus a one-piece design. Moreover, the cord cannot be easily threaded through these devices without first removing the slide from the socket and later replacing it, which is a disadvantage when installing the device onto cords. Additionally, this type of cord lock is less intuitive to operate and more difficult for a user to immediately comprehend.

A third type of prior art cord lock is exemplified by U.S. Pat. No. 4,769,874 to Tracy; U.S. Pat. No. 5,713,758 to Goodin et al.; and U.S. Pat. No. 5,791,022 to Bohman. In these locks, a tortuous path locks the cord within the device, and the tortuous path is somehow eliminated or negated to free the cord. Like the slide and socket cord locks discussed above, tortuous path cord locks cannot be quickly and easily installed on the cord, because the cord must first be threaded through a lengthy or tortuous path.

Various other cord locks and tighteners are disclosed in U.S. Pat. No. 4,222,157 to Forman; U.S. Pat. No. 4,639,978 to Boden; U.S. Pat. No. 5,263,528 to Patel; and U.S. Pat. No. 5,440,788 t Boden. These locks are either complex and composed of multiple parts, or they are unintuitive to operate, or they are unsuitable for use as a cord lock for drawstrings and other similar items.

Thus, it can be seen that a cord lock which has the convenience of installation and intuitiveness of use of a barrel lock, yet can be easily manufactured in one piece, would be a significant improvement over the prior art.

Accordingly, several objects and advantages of my invention are:

It provides a highly effective means for controlling the length of a drawstring or similar item.

It can be easily molded or otherwise formed in a single piece.

It can be quickly and easily installed on the cord.

It is intuitive and convenient to use.

It is adaptable to cords of various diameters and lengths, and can also be used to clamp hoses, tubes, filaments, or other elongated elements.

Further objects and advantages of my invention will become apparent from a consideration of the drawings and ensuing description.

SUMMARY OF THE INVENTION

The invention is a cord lock which has a simpler construction than prior art cord locks, and which can be easily manufactured of resilient material in a single piece.

DETAILED DESCRIPTION OF THE INVENTION

Figure 1:
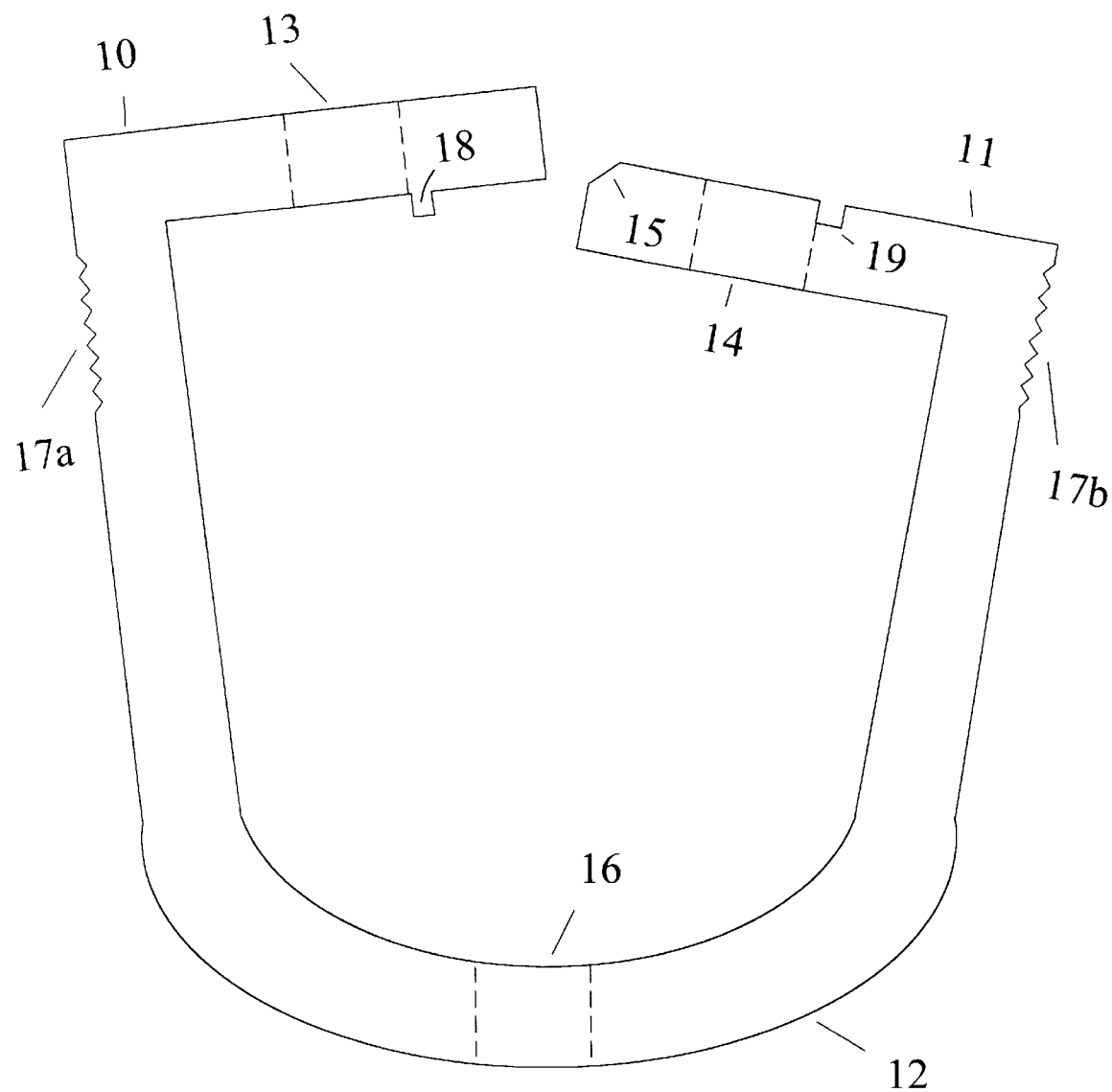
FIG. 1 is a top view of the device as molded, with the inner and outer arms in an unengaged position, apart from each other.

The following provides a list of the reference characters used in the drawings:
10. Outer arm
11. Inner arm
12. Hinging member
13. Outer arm opening
14. Inner arm opening
15. Inner arm bevel
16. Hinging member opening
17a&b. Finger grips
18. Stop ridge
19. Cavity
20. Beveled ridge (alternative embodiment)
21. Preload cavity (alternative embodiment)
22. Preload release tab (alternative embodiment)
23. Outer arm stability flange (alternative embodiment)
24. Outer arm stability ridge (alternative embodiment)
25. Inner arm stability flange (alternative embodiment)
26. Inner arm stability ridge (alternative embodiment)
27a&b. Outer arm branches (alternative embodiment)
28a&b. Outer arm branch openings (alternative embodiment)
29. Inner arm bevel (alternative embodiment)

FIG. 1 is a top view of the invention, illustrating its major components. One end of an L-shaped outer arm 10 and one end of an L-shaped inner arm 11 are integrally connected by a generally arcuate hinging member 12 to form the main body of the device. The device is constructed of plastic or any other suitably resilient material, such that outer arm 10 and inner arm 11 will flex into slidable contact against each other when pressure is applied to their sides, and will flex back, away from each other, when the pressure is released.

A rectangular outer arm opening 13, and a rectangular inner arm opening 14, are located on the free ends of outer arm 10 and inner arm 11 respectively. Outer arm opening 13 and inner arm opening 14 are through-openings, and are suitably sized to permit a cord or cords to be threaded through outer arm 10 and inner arm 31. An inner arm bevel 15 is located on the leading edge of the free end of inner arm 11. A square-shaped hinging member opening 16 is located generally in the center of hinging member 12. Hinging member opening 16 is also a through-opening, and is suitably sized to permit a cord or cords to be threaded through hinging member 12. Two knurled finger grips 17a&b are located at the sides of outer arm 10 and inner arm 11 respectively.

Figure 2:
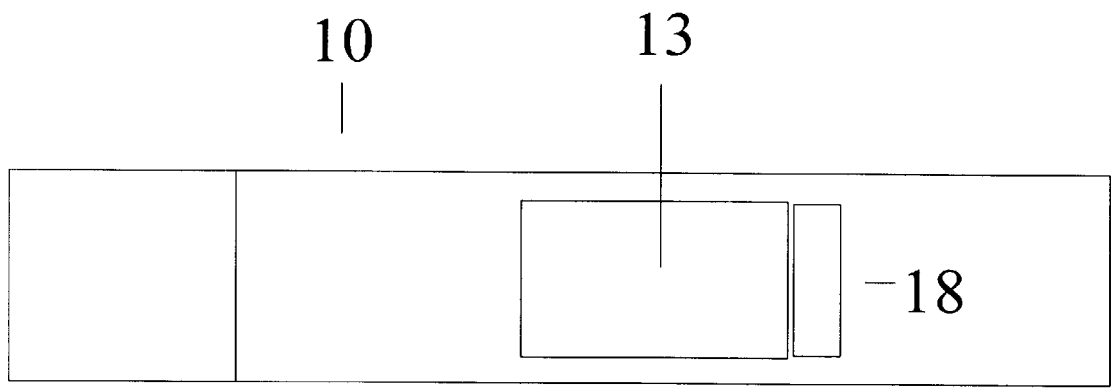
FIG. 2 is a side view of the outer arm, detailing the opening for the cord and the stop ridge which regulates the spring-back action of the arms once they are engaged against each other.
Figure 3:
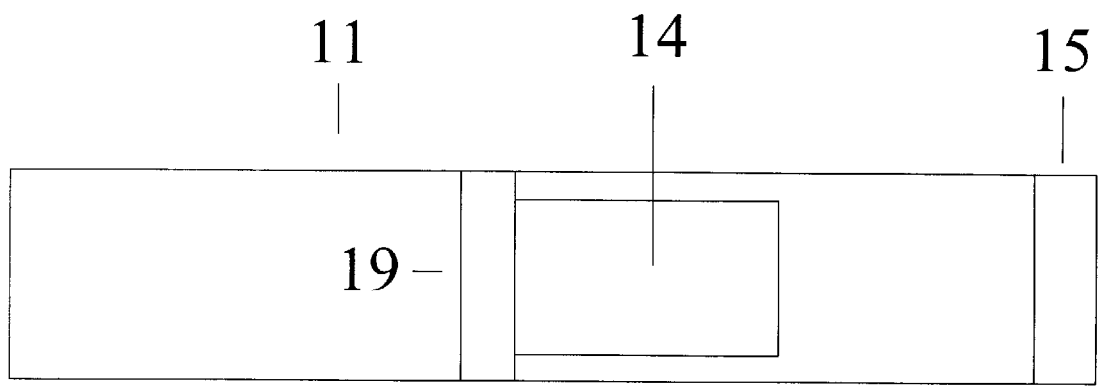
FIG. 3 is a side view of the inner arm, detailing the opening for the cord and the cavity which provides clearance for the stop ridge once the inner and outer arms are engaged against each other.

FIG. 2 provides detail on the construction of outer arm 10. A stop ridge 18 is located on outer arm 10, at that side of outer arm opening 13 which is proximate to the free end of outer arm 10. Stop ridge 18 has a square-shaped cross section and extends from the top to the bottom of outer arm opening 13. FIG. 3 provides detail on the construction of inner arm 11. A cavity 19 is located on inner arm 11, at that side of inner arm opening 14 which is further from the free end of inner arm 11. Cavity 19 has a square-shaped cross section, extends from the top to the bottom of inner arm 11, and is suitably sized to receive stop ridge 18.

To engage the device, pressure is applied to the sides of outer arm 10 and inner arm 11 in the general area of finger grips 17a&b, which urges outer arm 10 and inner arm 11 together.

Figure 4:
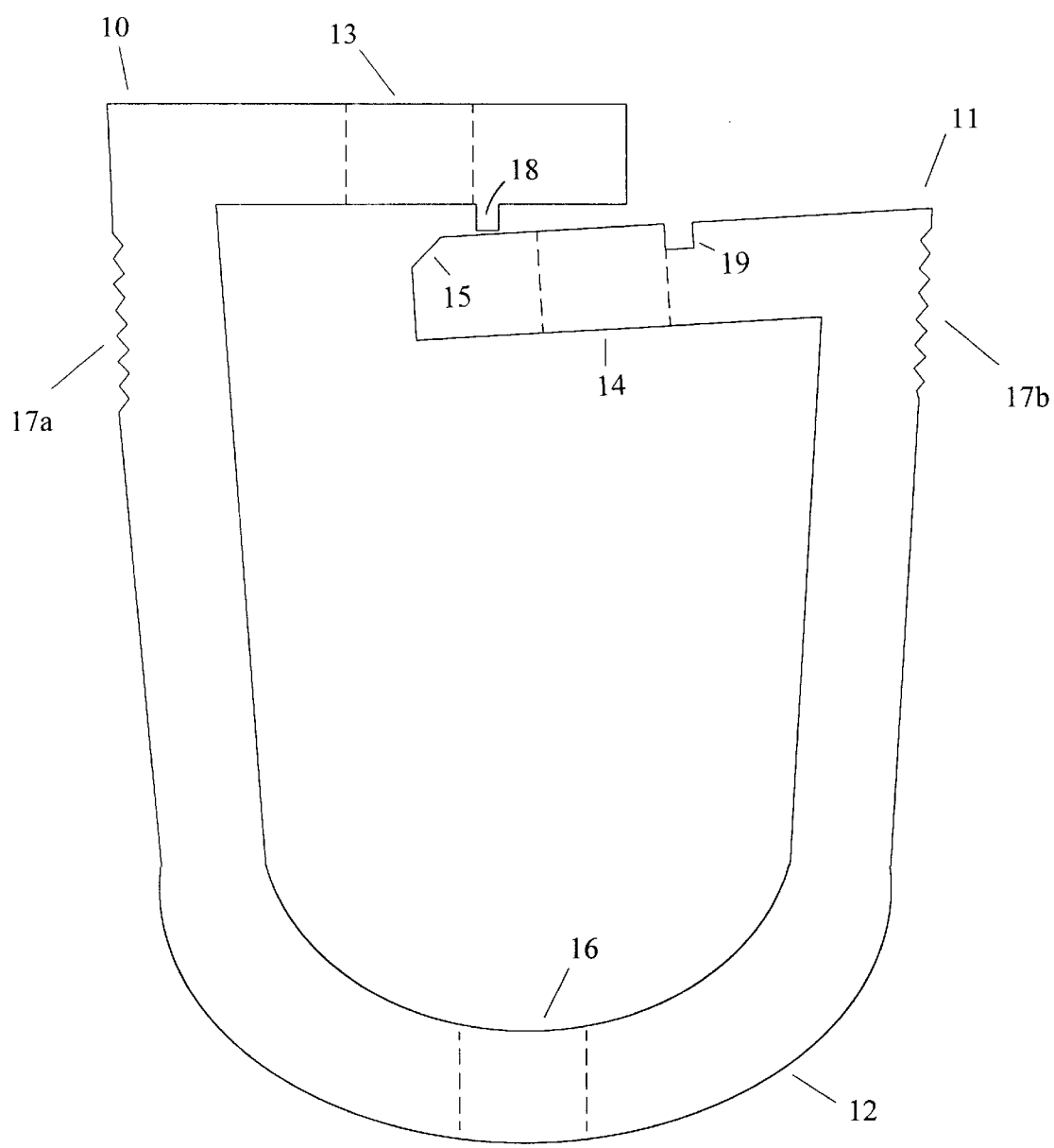
FIG. 4 is a top view of the device, with the inner and outer arms in the process of engaging against each other.

FIG. 4 illustrates the device during the engagement process—as outer arm 10 and inner arm 11 come together, outer arm 10 passes over inner arm 11, and inner arm 11 correspondingly nests under outer arm 10. Inner arm bevel 15 allows stop ridge 18 to ride over the leading edge of inner arm 11 during engagement, and stop ridge 18 thus separates outer arm 10 and inner arm 11 slightly during the initial engagement process. As outer arm 10 and inner arm 11 continue to be urged together, stop ridge 18 passes into inner arm opening 14, allowing outer arm 10 and inner arm 11 to snap into full slidable contact. The device is now engaged.

Figure 5:
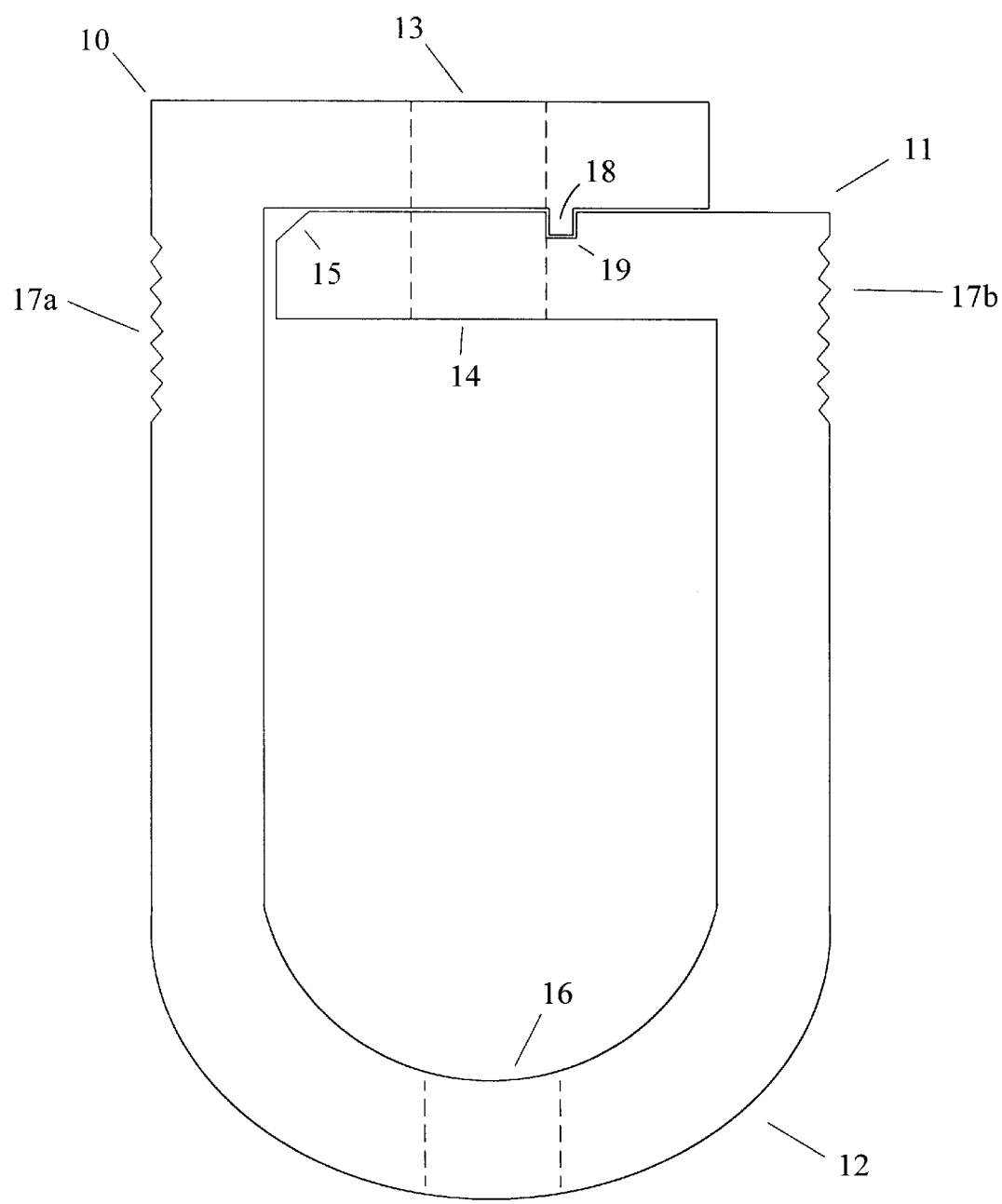
FIG. 5 is a top view of the device, with the inner and outer arms in an engaged and fully-urged-together position, such that a cord will pass easily through the openings in the inner and outer arms.

As shown in FIG. 5, when the device is in an engaged state, urging outer arm 10 and inner arm 11 fully together positions outer arm opening 13 and inner arm opening 14 in line with one another. A cord or cords can then be threaded through outer arm opening 13 and inner arm opening 14. Stop ridge 18 moves into cavity 19, and thus does not block inner arm opening 14.

Figure 6:
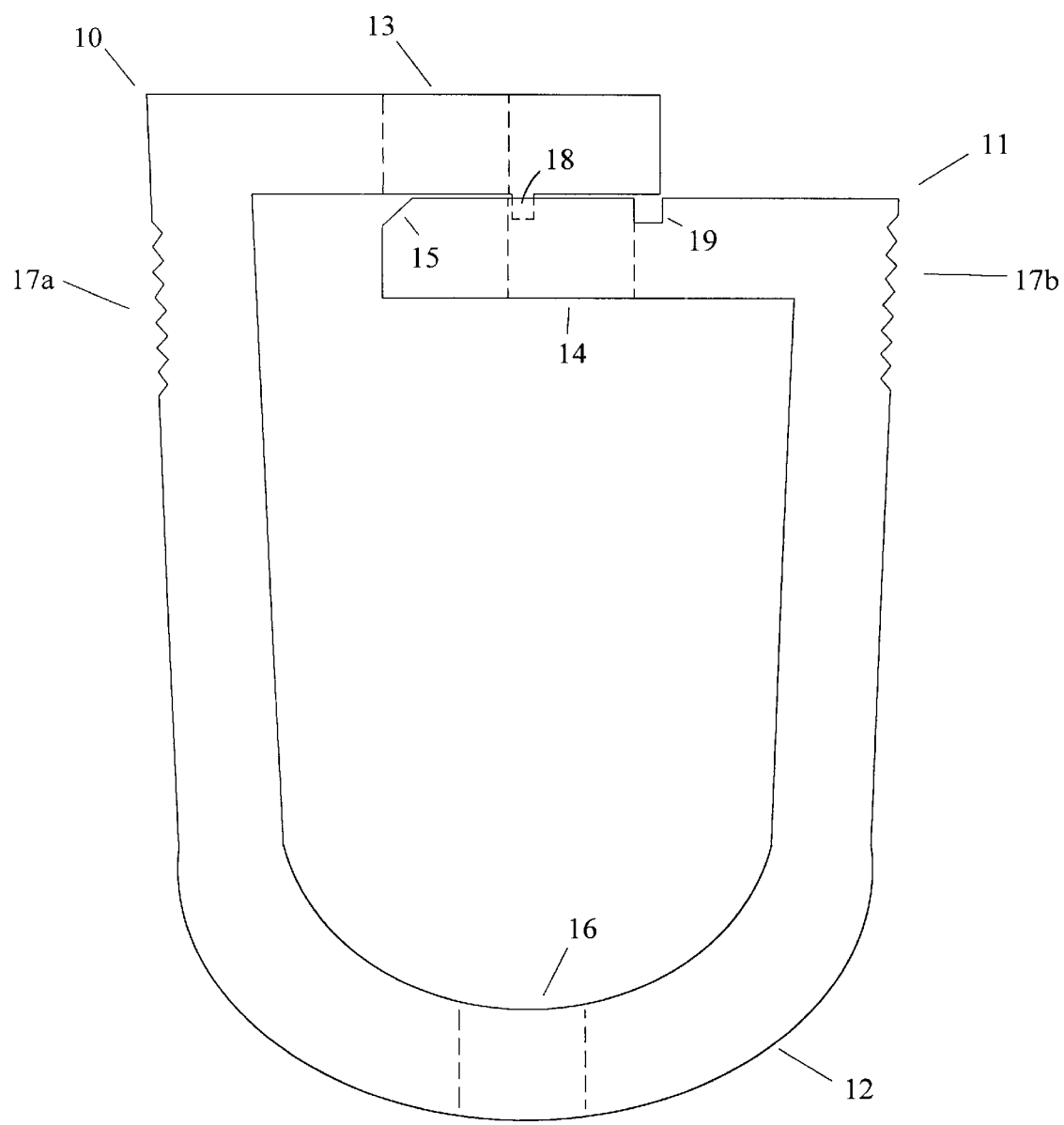
FIG. 6 is a top view of the device, with the inner and outer arms in an engaged but sprung-back position, such that a cord will be pinched between the openings in the inner and outer arms and prevented from moving.

As shown in FIG. 6, after the cord or cords have been threaded, releasing the urging-together pressure causes outer arm 10 and inner arm 11 to slide back to a position wherein the cord will be pinched between outer arm opening 13 and inner arm opening 14, and will be prevented from moving. The presence of the cord will itself inhibit outer arm 10 and inner arm 11 from sliding further apart; however, stop ridge 18 acts as an additional positive stop by forcing the cord against the free end-proximate side of inner arm opening 14.

The cord or cords are additionally threaded through hinging member opening 16, either during or after the basic threading process described above. After the device has been installed, the length of the cord or cords is regulated by simply applying pressure to the sides of outer arm 10 and inner arm 11 to free the cord, moving the device to the desired position on the cord, and then releasing the pressure to lock the cord.

Figure 7:
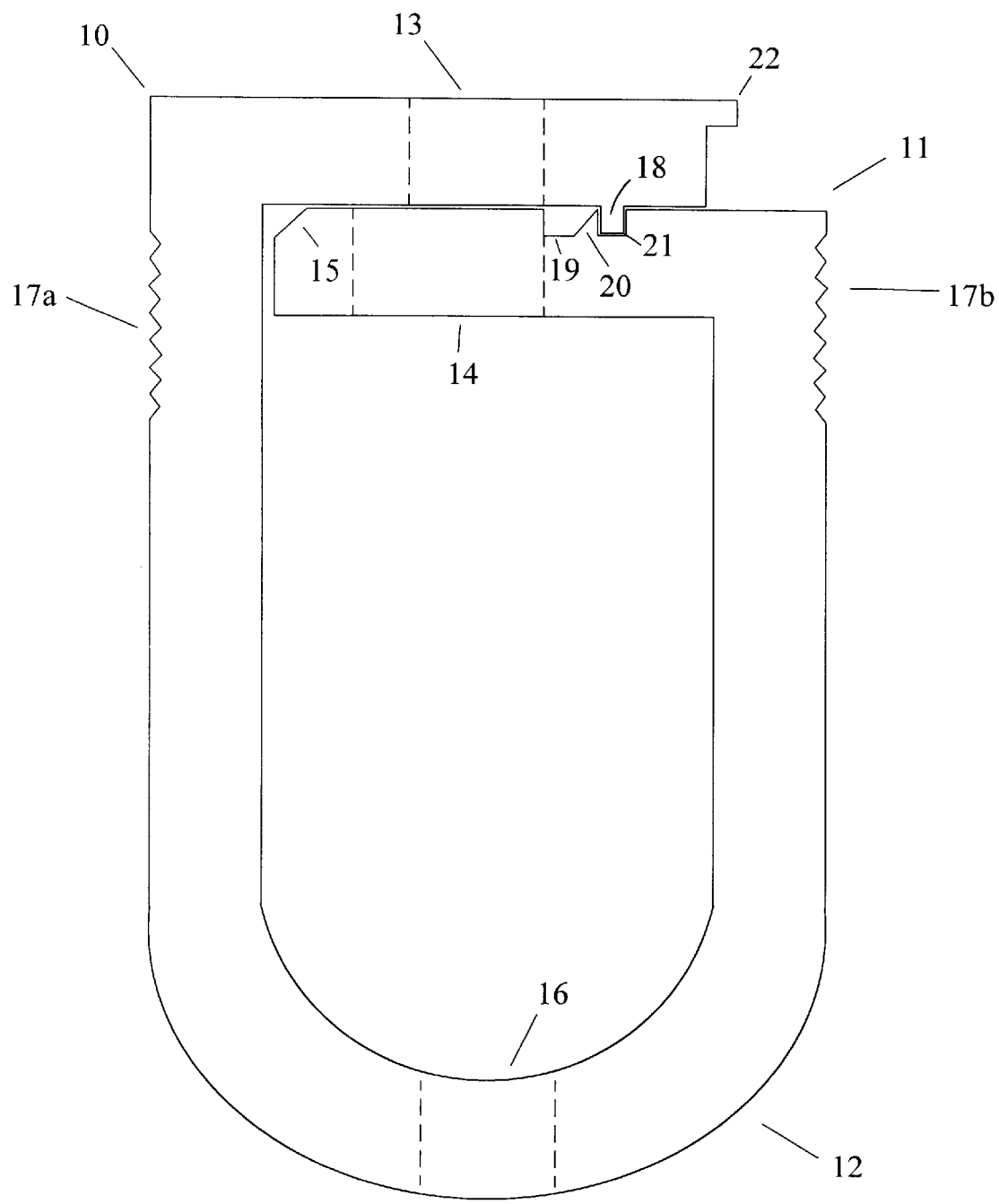
FIG. 7 illustrates an alternative embodiment, wherein a beveled ridge located on the inner arm has engaged the stop ridge, thereby holding the device is a "preloaded" position.

FIG. 7 illustrates an alternative embodiment, wherein a beveled ridge 20 is located on inner arm 11 adjacent to cavity 19. Beveled ridge 20 has a wedge-shaped cross-section and extends from the top to the bottom of inner arm 11. A preload cavity 21 is also located on inner arm 11 adjacent to beveled ridge 20. Preload cavity 21 has a square-shaped cross-section, extends from the top to the bottom of inner arm 11, and is suitably sized to receive stop ridge 18. A preload release tab 22 is located on the leading edge of the free end of outer arm 10, and extends from the top to the bottom of outer arm 10. In this embodiment, inner arm opening 14 is wider than outer arm opening 13, rather than being the same width as in the main embodiment. The greater width of inner arm opening 14 allows the cord passage to be of sufficient width when the device is in either the preloaded position or the normal, engaged position.

To move the device from the engaged position into the preloaded position, outer arm 10 and inner arm 11 are urged further together. Stop ridge 18 rides over beveled ridge 20 and passes into preload cavity 21. Preload cavity 21 retains stop ridge 18, thus holding the device in a preloaded position wherein a cord or cords can be easily threaded through outer arm opening 13 and inner arm opening 14. After the cord is threaded, the device is released from the preloaded position by exerting pressure on preload release tab 22. This allows stop ridge 18 to pass back over beveled ridge 20, into cavity 19 and inner arm opening 14. The device is thus returned to the normal, engaged state. Other parts, and other operating steps, are the same as in the main embodiment.

Figure 8:
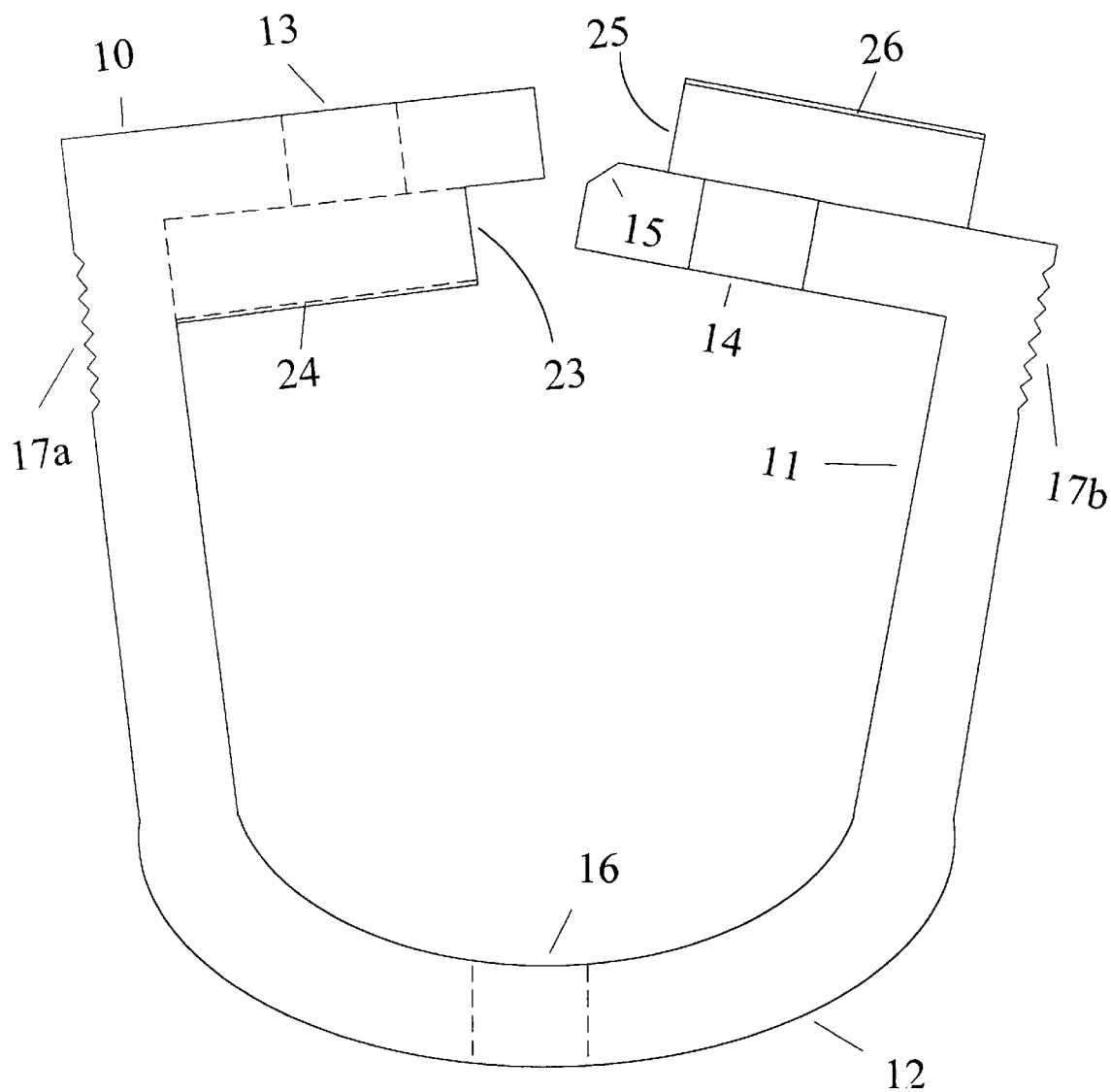
FIG. 8 illustrates an alternative embodiment, wherein flanges are located on the inner and outer arms, to positively hold the arms against each other and stabilize their movement.

FIG. 8 illustrates an alternative embodiment, wherein an outer arm stability flange 23 and an inner arm stability flange 25 are located on outer arm 10 and inner arm 11 respectively, to positively hold outer arm 10 and inner arm 11 against each other and stabilize their movement. It can be appreciated that the cord-gripping ability of the device is maximized when outer arm 10 and inner arm 11 are held firmly against each other. While the main embodiment can certainly be molded or otherwise constructed so that outer arm 10 and inner arm 11 are naturally held in close slidable contact by their resilient natures, outer arm stability flange 23 and inner arm stability flange 25 provide an alternative way of ensuring said close slidable contact.

Figure 9:
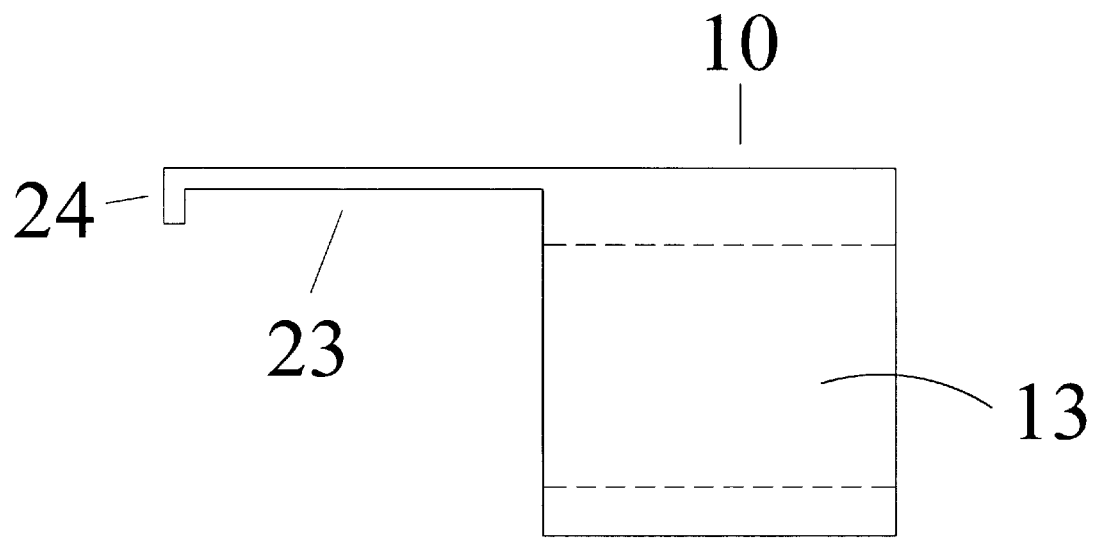
FIG. 9 is a head-on view of the free end of the outer arm of the FIG. 8 embodiment, detailing the outer arm stability flange and ridge.

The alternative embodiment of FIG. 8 is further detailed in FIG. 9. Outer arm stability flange 23 has a flat, plate-like shape and extends from the top of the free end of outer arm 10. An outer arm stability ridge 24 is attached perpendicularly to outer arm stability flange 23. Outer arm 10, outer arm stability flange 23, and outer arm stability ridge 24 thus act to form a channel, through which inner arm 11 travels when outer arm 10 and inner arm 11 are urged together. Similarly, inner arm stability flange 25 has a flat, plate-like shape and extends from the bottom of the free end of inner arm 11. An inner arm stability ridge 26 is attached perpendicularly to inner arm stability flange 25. Inner arm 10, inner arm stability flange 25, and inner arm stability ridge 26 thus act to form a channel, through which outer arm 10 travels when outer arm 10 and inner arm 11 are urged together.

It should also be noted that in this embodiment, outer arm opening 13 and inner arm opening 14 are not bounded on both the top and the bottom, as in the main embodiment. Rather, outer arm opening 13 is of a square slot shape, open at the bottom of outer arm 10. Similarly, inner arm opening 14 is of a square slot shape, open at the top of inner arm 11. As outer arm 10 and inner arm 11 are urged together during the engagement process, outer arm stability flange 23 and inner arm stability flange 25 cover inner arm opening 14 and outer arm opening 13 respectively, closing off said openings. For clarity, stop ridge 18 and cavity 19 are not shown; however, means for providing a positive stop when this embodiment is in an engaged state, and means for preloading this embodiment, can easily be incorporated. Other parts, and other operating steps, are the same as in the main embodiment.

Figure 10:
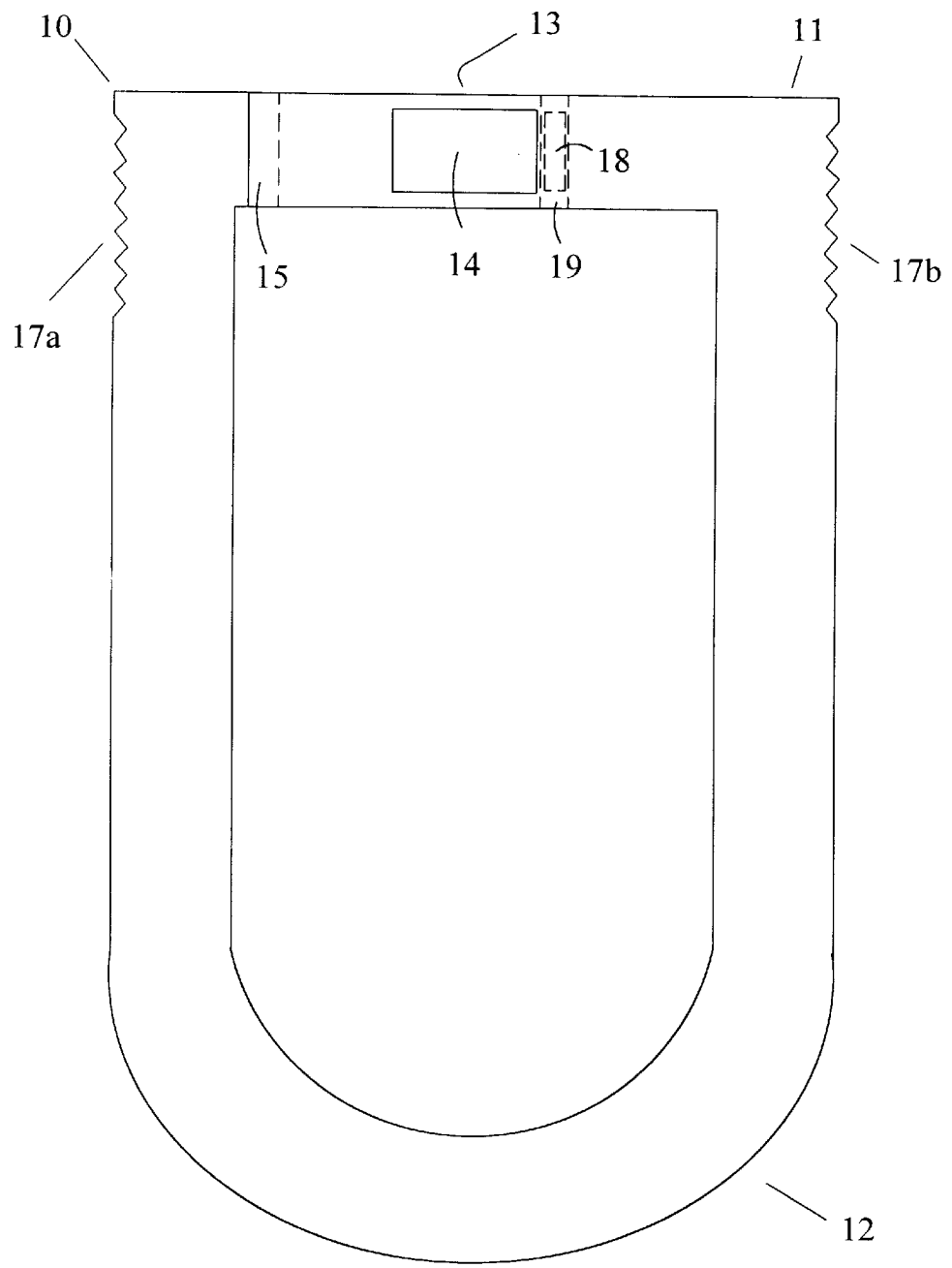
FIG. 10 illustrates an alternative embodiment, wherein the hinging member is oriented differently than in the main embodiment; that is, it is oriented perpendicular to the plane described by the path of the cord through the arms.

FIG. 10 illustrates an alternative embodiment, wherein hinging member 12 is oriented differently than in the main embodiment; that is, it is oriented perpendicular to the plane described by the path of the cord through outer arm opening 13 and inner arm opening 14. Hinging member opening 16 is not present in this embodiment, and the cord or cords are only threaded through outer arm opening 13 and inner arm opening 14. Other parts, and other operating steps, are the same as in the main embodiment.

Figure 11:
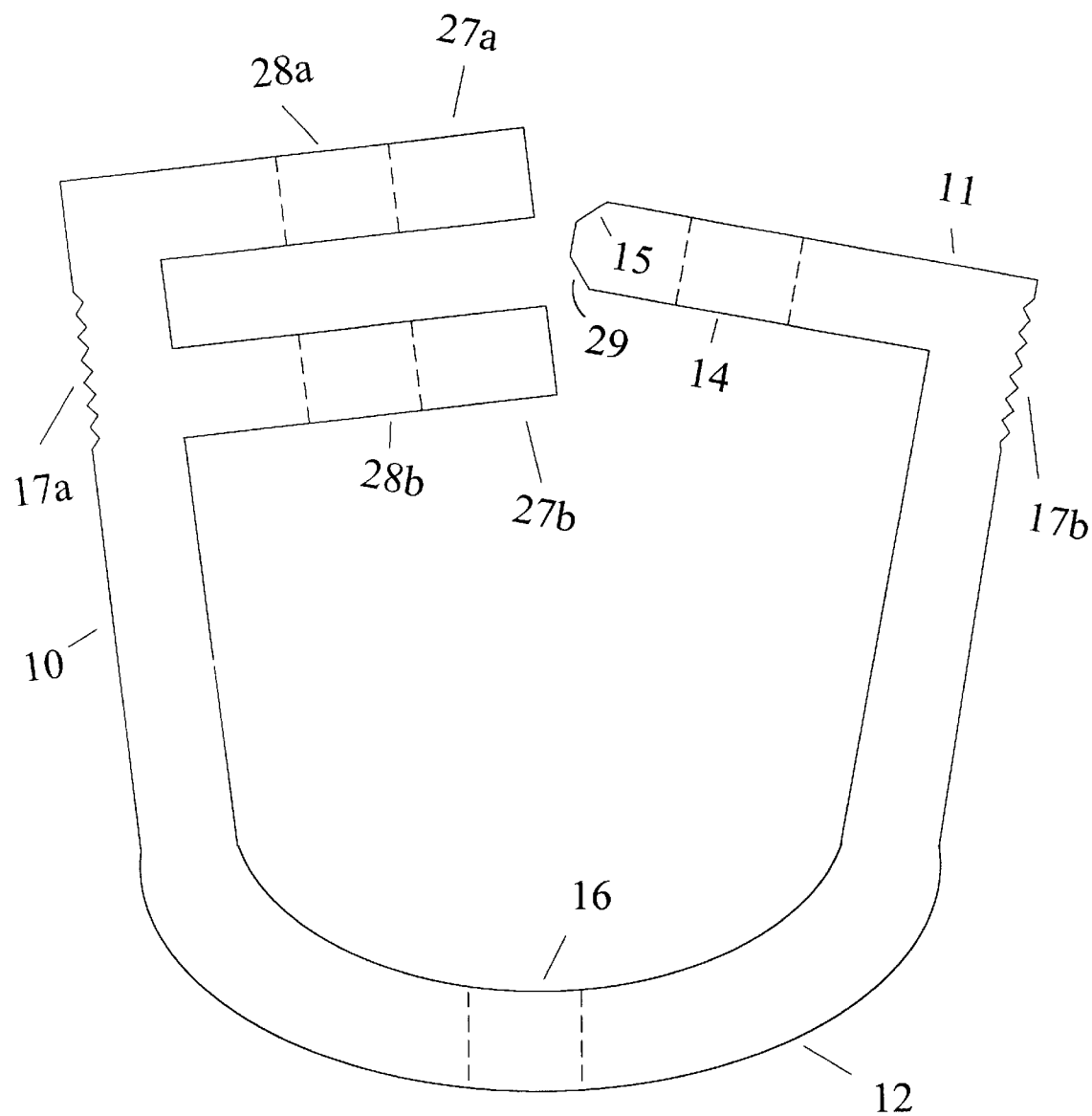
FIG. 11 illustrates an alternative embodiment, wherein the outer arm has two "branches" which engage on either side of the inner arm.

FIG. 11 illustrates an alternative embodiment wherein outer arm 10 divides into two outer arm branches 27a&b, which engage on either side of inner arm 11. Two outer arm branch openings 28a&b are located through the free ends of outer arm branches 27a&b respectively. An additional inner arm bevel 29 is located on the leading edge of the free end of inner arm 11, to further facilitate the urging together of outer arm 10 and inner arm 11. Situating inner arm 11 between outer arm branches 27a&b provides an alternative way of ensuring that inner arm 11 and outer arm branches 27a&b remain in close slidable contact during operation of the device, thus maximizing the cord-gripping ability of the device. For clarity, stop ridge 18 and cavity 19 are not shown; however, means for providing a positive stop when this embodiment is in an engaged state, and means for preloading this embodiment, can easily be incorporated. Other parts, and other operating steps, are the same as in the main embodiment.

Thus the reader will see that this invention provides a simple, yet very effective means for regulating the length of a cord.

While my above description contains many specificities, these shall not be construed as limitations on the scope of the invention, but rather as exemplifications of embodiments thereof. Many other variations are possible. Several such examples follow:

The inner and outer arms can be of a different shape than the L-shape shown in the main embodiment. As one example, they may be of a curved shape, such that the curved inner arm nests inside the curved outer arm as the arms are urged together. The outer arm can have multiple branches, not just two as in the embodiment of FIG. 11, which interpose between multiple branches of the inner arm. The free end of one arm can even be formed in the shape of a barrel, having a cavity into which the free end of the other arm can communicate, like a plunger.

The inner and outer arm openings can be of various shapes and sizes, for example circular or square in nature. In the alternative embodiment of FIGS. 8 and 9, the inner and outer arm openings can be closed at both the top and the bottom, as in the main embodiment, rather than being formed as slots open at the top or bottom. In the main embodiment, the openings in the inner arm, outer arm, and hinging member can be formed in an "offset" manner to maximize the simplicity of molding the device. Additionally, teeth or other similar serrations can be added to the inside of the inner and outer arm openings, to maximize the cord-gripping ability of the device.

The hinging member can be differently shaped than the generally arcuate shape shown in the main embodiment. As one example, it can be a straight bar, to which the non-free ends of the inner and outer arms are connected. The hinging member opening can be eliminated, which of course eliminates the step of threading the cord through the hinging member opening. Various guide means can also be added, to facilitate the threading of the cord through the device.

The stop ridge and the cavity can be eliminated, as long as the inner and outer arms are molded or otherwise constructed so that they remain in close slidable contact when the device is engaged. When the inner and outer arms are in close slidable contact with each other, the presence of the cord itself, pinched between the inner and outer arm openings, will prevent the inner and outer arms from sliding further apart. Additionally, the stop ridge, cavity, beveled ridge, and preload cavity can be located differently on the inner and outer arms. As examples, the stop ridge can be located on the inner arm; and the cavity, beveled ridge, and preload cavity can be located on the outer arm. The stop ridge can be located such that it does not travel back and forth within the inner arm opening, but rather travels back and forth within a separate, elongated cavity.

Various means, other than the stop ridge shown in the main embodiment, can be used to provide a positive stop when the device is in an engaged state. Similarly, various means, other than the beveled ridge and preload cavity shown in FIG. 7, can be used for preloading the device. In addition, various means, other than the flanges and ridges shown in FIGS. 8 and 9, can be used to stabilize the arms against movement other than the desired slidable contact.

The device can be constructed of various materials, including plastic, spring wire, or other metal, formed such that the inner and outer arms have the resilience necessary to flex inward when urged together, and flex outward when the urging-together pressure is released.

Although an advantage of the device is that it can be easily manufactured in one piece, the device can certainly also be formed of several pieces which are then attached together during the manufacturing process.

Although the device is presented as a cord lock, it can also be used for clamping hoses, tubes, filaments, or other elongated elements.

Accordingly, the scope of the invention should be determined not by the embodiments illustrated, but by the appended claims and their legal equivalents.

I claim:

1. A device for gripping an elongated element, comprising:
   (a) at least two arms, each said arm having a first end and a second end, and each said arm having an opening located on said first end suitably sized for introducing said elongated element therethrough, and
   (b) connecting means for attaching said second ends of said arms together, and
   (c) corresponding locking means located on at least one of said arms, for securing said arms in an urged-together position wherein said elongated element can be introduced through said openings in said arms while said locking means is engaged,
   whereby by applying pressure to urge said arms together, said device can be moved along the length of said elongated element and then be retained in position on said elongated element by the release of said pressure.

2. The device of claim 1, wherein stop means are located on at least one of said arms, for preventing said arms from urging apart further than is necessary to retain said elongated element in said device.

3. The device of claim 2, wherein said stop means comprise a ridge located on one of said arms and a corresponding cavity located on another of said arms.

4. The device of claim 1, wherein said locking means comprise a ridge located on one of said arms and a corresponding cavity located on another of said arms.

5. The device of claim 4, wherein release means are located on at least on of said arms, for unlocking said arms from said urged-together position.

6. The device of claim 1, wherein said connecting means are oriented in a plane formed by the path of said elongated element through said openings in said arms.

7. The device of claim 6, wherein said connecting means comprise an arcuate hinging member.

8. The device of claim 1, wherein said connecting means are oriented in a plane other than that formed by the path of said elongated element through said openings in said arms.

9. The device of claim 8, wherein said connecting means are oriented in a plane perpendicular to that formed by the path of said elongated element through said openings in said arms.

10. The device of claim 1, wherein said first end of one said arm has two branches stemming therefrom, said branches engaging on opposite sides of the free end of another said arm.

11. A device for gripping an elongated element, comprising:
    (a) at least two arms, each said arm having a first end and a second end, and each said arm having an opening located on said first end suitably sized for introducing said elongated element therethrough, and said first end of one said arm having two branches stemming therefrom, said branches engaging on opposite sides of the first end of another said arm, and
    (b) connecting means for attaching said second ends of said arms together,
    (c) corresponding locking means located on at least one of said arms, for securing said arms in an urged-together position wherein said elongated element can be introduced through said openings in said arms while said locking means is engaged,
    whereby by applying pressure to urge said arms together, said elongated element can be introduced through said openings and then be pinched in place between said openings by the release of said pressure.

12. The device of claim 11, wherein stop means are located on at least one of said arms, for preventing said arms from urging apart further than is necessary to retain said elongated elements in said device.

13. The device of claim 12, wherein said stop means comprise a ridge located on one of said arms and a corresponding cavity located on another of said arms.

14. The device of claim 11, wherein said locking means comprise a ridge located on one of said arms and a corresponding cavity located on another of said arms.

15. The device of claim 14, wherein release means are located on at least on of said arms, for unlocking said arms from said urged-together position.

16. The device of claim 11, wherein said connecting means are oriented in a plane formed by the path of said elongated element through said openings in said arms.

17. The device of claim 16, wherein said connecting means comprise an arcuate hinging member.

18. The device of claim 11, wherein said connecting means are oriented in a plane other than that formed by the path of said elongated element through said openings in said arms.

19. The device of claim 18, wherein said connecting means are oriented in a plane perpendicular to that formed by the path of said elongated element through said openings in said arms.

* * * * *